(12) United States Patent
Mori et al.

(10) Patent No.: US 7,682,129 B2
(45) Date of Patent: Mar. 23, 2010

(54) FILTRATION DEVICE COMBINED WITH SELF-PRIMING PUMP

(75) Inventors: Yoji Mori, Tokyo (JP); Takashi Sasaki, Joso (JP); Yasuichi Haga, Joso (JP)

(73) Assignee: World Chemical Co., Ltd., Tokyo (JP)

( * ) Notice: Subject to any disclaimer, the term of this patent is extended or adjusted under 35 U.S.C. 154(b) by 568 days.

(21) Appl. No.: 11/785,985

(22) Filed: Apr. 23, 2007

(65) Prior Publication Data

US 2007/0248456 A1 Oct. 25, 2007

(30) Foreign Application Priority Data

Apr. 24, 2006 (JP) .......................... P2006-119121

(51) Int. Cl.
*F03B 11/00* (2006.01)
(52) U.S. Cl. .................. 415/169.1; 415/98; 415/169.4; 415/212.1
(58) Field of Classification Search .................. 415/98, 415/169.1, 169.4, 212.1
See application file for complete search history.

(56) References Cited

U.S. PATENT DOCUMENTS

| | | | | |
|---|---|---|---|---|
| 4,618,425 A | * | 10/1986 | Yates | .......................... 417/473 |
| 5,021,151 A | * | 6/1991 | Yane | ............................. 415/98 |
| 5,178,523 A | | 1/1993 | Cheng-Chung | |
| 5,246,336 A | * | 9/1993 | Furukawa | ..................... 415/98 |
| 6,485,257 B1 | | 11/2002 | Base et al. | |

FOREIGN PATENT DOCUMENTS

| | | |
|---|---|---|
| EP | 1 267 085 | 12/2002 |
| JP | 2004 188337 | 7/2004 |
| JP | 2005 238071 | 9/2005 |
| WO | WO 2004/009209 | 1/2004 |

\* cited by examiner

*Primary Examiner*—Igor Kershteyn
(74) *Attorney, Agent, or Firm*—Roylance, Abrams, Berdo & Goodman, L.L.P.

(57) ABSTRACT

The present invention provides a filtration device combined with self-priming pump in which a filter replacement work is easy and safe, and removal of air inside of a pump and priming are not necessary. And this filtration device is characterized to provide with a pump unit, which is a valveless-construction self-priming pump without a check valve, including a suction port, a suction chamber, an impeller, a self-priming chamber, a discharge port from an upstream of a channel to a downstream thereof in this order, the suction port and the discharge port being arranged above the level of the suction chamber and the impeller, and a self-priming chamber arranged above the level of the suction port and the discharge port; a filtration unit arranged on a channel between the self-priming chamber and the discharge port and above the level of the self-priming chamber; and a filter arranged inside of the filtration unit and above the level of residual liquid inside of the pump unit at the time of suspending of the pump unit.

9 Claims, 4 Drawing Sheets

FILTRATION DEVICE COMBINED WITH SELF-PRIMING PUMP

FIELD OF THE INVENTION

The present invention relates to a filtration device combined with self-priming pump.

DESCRIPTION OF THE PRIOR ART

In chemical and other fields, filtration devices are generally used as a means for removing impurities from various kinds of liquids. In particular, as a filtration device provided with a pump in which liquid retained in a tank or the like is suctioned, the suctioned liquid is filtered through a filter, and then delivered to a post-process, or delivered back to the tank for circulation, a filtration device provided with a push pump with a foot valve is known (See: Japan Patent Pre-Publication No. 2005-238071 and Japan Patent Pre-Publication No. 2004-188337).

On the other hand, as a valveless-construction self-priming pump, a self-priming chemical pump is known (See: Japan Patent No. 2665140).

SUMMARY OF THE INVENTION

In the filtration devices disclosed in the above mentioned Japan Patent Pre-Publication No. 2005-238071 and No. 2004-188337, liquid drainage in a drain needs to be previously performed upon replacement of a filter.

However, this operation has a drawback in that collection of the liquid drained from the drain needs to be performed manually by using a bucket or the like, and thus, this is not only complicated but also dangerous depending on the type of liquid.

Another drawback is that the filter that has been submerged in the liquid prior to the liquid drainage causes dripping of accumulated liquid left on the surface or inside of the filter even when the liquid drainage is performed. Thus, a worker and areas surrounding the device are not only contaminated, but also it is difficult to extract the filter with liquid dripping, and the replacement work is complicated and troublesome. Further, danger may be involved depending on the type of liquid.

Still another drawback is that, upon resuming the operation after the replacement of the filter, removal of air inside of the pump and priming are necessary. Thus, it is not only time-consuming but it also makes an operation suspension time long.

Therefore, an object of the present invention is to provide a filtration device combined with self-priming pump in which a filter replacement work is easy and safe, and removal of air inside of the pump and priming are not necessary.

The present invention solving the above problems are characterized by the following construction:

(1) A filtration device combined with self-priming pump, comprising:

a pump unit, which is a valveless construction self-priming pump without a check valve, including:

a suction port, a suction chamber, an impeller, a self-priming chamber, a discharge port from an upstream of a channel to a downstream thereof in this order, the suction port and the discharge port being arranged above a level of the suction chamber and the impeller, and the self-priming chamber being arranged above a level of the suction port and the discharge port, a filtration unit arranged on a channel between the self-priming chamber and the discharge port and above a level of the self-priming chamber; and a filter arranged inside of the filtration unit and above a level of residual liquid inside of the pump unit at a time of suspending of the pump unit.

(2) The filtration device combined with self-priming pump according to the above construction (1), wherein the filtration unit is arranged above the self-priming chamber.

(3) The filtration device combined with self-priming pump according to the above construction (1) or (2), wherein the suction chamber and the self-priming chamber are equal or approximately equal in capacity.

(4) The filtration device combined with self-priming pump according to the above construction (1) or (2), wherein the pump unit and the filtration unit are configured as one unit.

(5) The filtration device combined with self-priming pump according to the above construction (1) or (2), wherein the pump unit and the filtration unit are configured as a separate unit such that the filtration unit is connected above the pump unit.

(6) The filtration device combined with self-priming pump according to the above construction (1) or (2), wherein the filter is a cartridge type that is detachable and replaceable.

(7) The filtration device combined with self-priming pump according to the above construction (1) or (2), wherein a drive unit of the pump unit is a magnet-coupling type drive unit.

(8) The filtration device combined with self-priming pump according to the above construction (1) or (2), wherein inside of the self-priming chamber, a perforated plate for separating air and liquid is arranged.

(9) The filtration device combined with self-priming pump according to the above construction (1) or (2), wherein below a level of the filtration unit, a safety check valve for checking and/or discharging residual liquid inside of the filtration unit is arranged.

According to the invention of the above (1), the filtration device combined with self-priming pump is configured to include a pump unit, which is a valveless-construction self-priming pump without a check valve, including: a suction port, a suction chamber, an impeller, a self-priming chamber, a discharge port from an upstream of a channel to a downstream thereof in this order, the suction port and the discharge port being arranged above the level of the suction chamber and the impeller, and a self-priming chamber arranged above the level of the suction port and the discharge port; a filtration unit arranged on a channel between the self-priming chamber and the discharge port and above the level of the self-priming chamber; and a filter arranged inside of the filtration unit and above the level of residual liquid inside of the pump unit at the time of suspending of the pump unit. Thus, at the time of suspending the operation, the liquid inside of the filtration unit is discharged and flown back so that the liquid is emptied, and the liquid accumulated or adhering in the mesh of the filter or on the surface thereof is also flown out. As a result, without performing liquid drainage or the like from a drain, the filter inside of the filtration unit can be extracted and replaced without causing liquid dripping. Therefore, the filter replacement work can be performed very easily, without contaminating a worker or surrounding areas of the device. In particular, even when the liquid is a dangerous chemical, the filter replacement work can be performed without creating risk.

At the time of suspending the operation, the liquid inside of the filtration unit is emptied. However, the liquid is left in an area of the suction chamber and the impeller arranged below the level of the suction port and the discharge port. Thus, the operation can be immediately resumed simply by restarting the pump unit, without removal of air or priming.

According to the invention of the above (2), the filtration unit is configured to be arranged above the self-priming chamber, and thus, the self-priming chamber and the filtration unit can be easily arranged in a connecting state and on the channel between the discharge port and the self-priming chamber.

According to the invention of the above (3), the suction chamber and the self-priming chamber are equal or approximately equal in capacity. Thus, a capacity of liquid to be moved at an operation suspended time and that at an operation resumed time can be rendered equal or approximately equal. In particular, at the time of resuming the operation, the rotation of the impeller moves all liquid in the suction chamber to the self-priming chamber, and thus, the liquid surface in the suction chamber rises by as much as the liquid to be moved, and thereafter, the liquid amount of twice as much is circulated in the self-priming chamber and other parts. Therefore, a suction amount is large and a self-priming operation ends promptly.

According to the invention of the above (4), the pump unit and the filtration unit are configured as one unit, and thus, it is possible to achieve further miniaturization and a simpler configuration, as compared to a separate-type configuration.

According to the invention of the above (5), the pump unit and the filtration unit are configured as a separate unit such that the filtration unit is connected above the pump unit, and thus, a self-priming pump already existing and installed can be diverted for the filtration device.

According to the invention of the above (6), the filter is a cartridge type that is detachable and replaceable. Thus, the replacement can be completed by simply replacing the cartridge-type filter upon replacement of the filter.

According to the invention of the above (7), a drive unit of the pump unit is a magnet-coupling type drive unit, and thus, liquid tightness in the pump unit can be ensured.

According to the invention of the above (8), in the inside of the self-priming chamber, a perforated plate for separating air and liquid is arranged. Thus, by separating the air from the liquid containing air, the air separated from the liquid moves upward and the liquid in which the air is separated can be moved downward. As a result, it becomes possible to suppress a performance deterioration of the impeller caused due to a decrease in centrifugal force when the liquid containing the air enters.

According to the invention of the above (9), below the level of the filtration unit, a safety check valve capable of checking and/or discharging residual liquid inside of the filtration unit is arranged. Thus, by releasing the safety check valve, it is possible to check the residual liquid inside of the filtration unit upon replacement of the filter. When the residual liquid is accumulated inside of the filtration unit, the liquid can be discharged from the released safety check valve.

DETAILED DESCRIPTION OF PREFERRED EMBODIMENT

Figure 1:
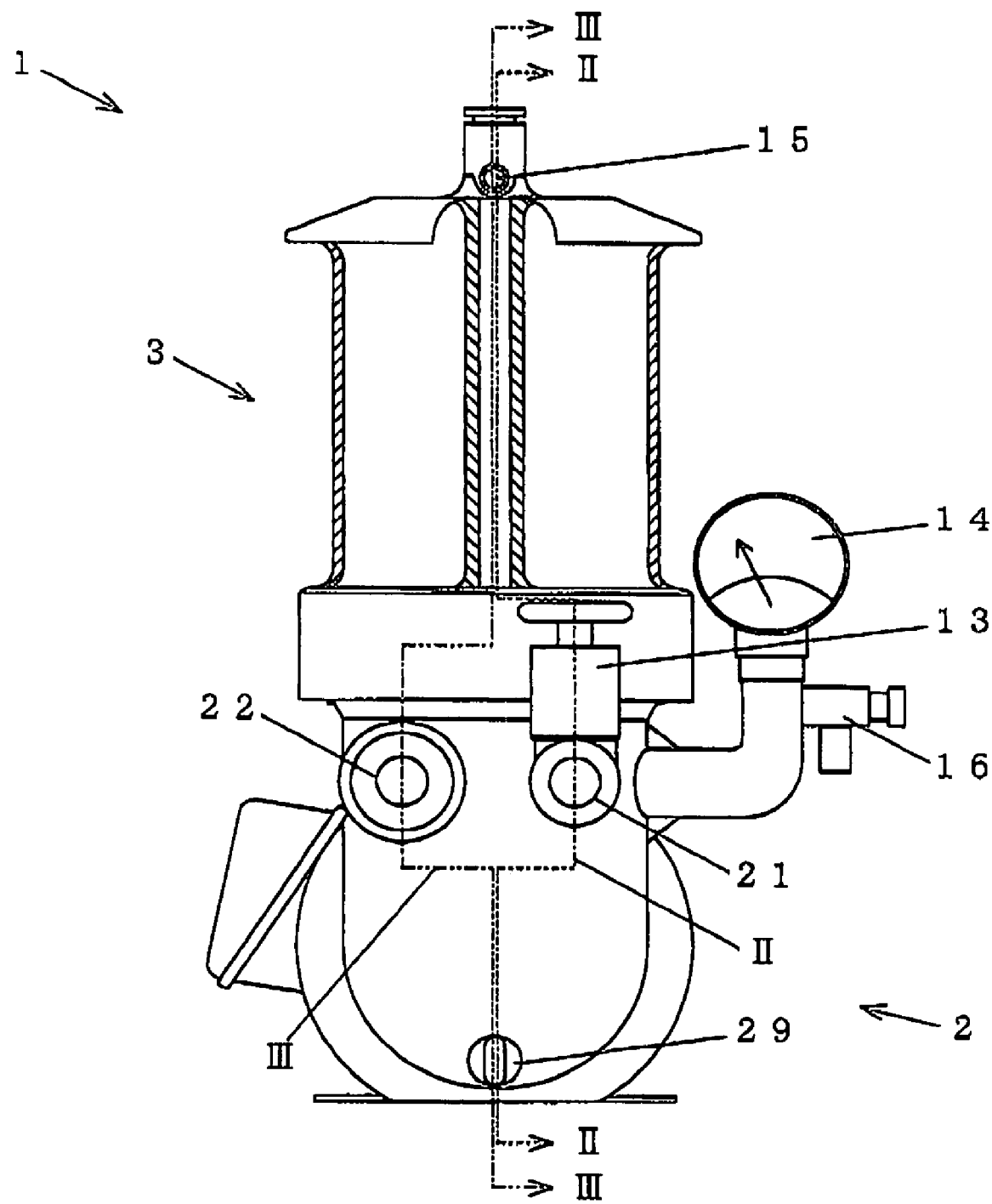
FIG. 1 is a schematic frontal view showing a first embodiment.
Figure 2:
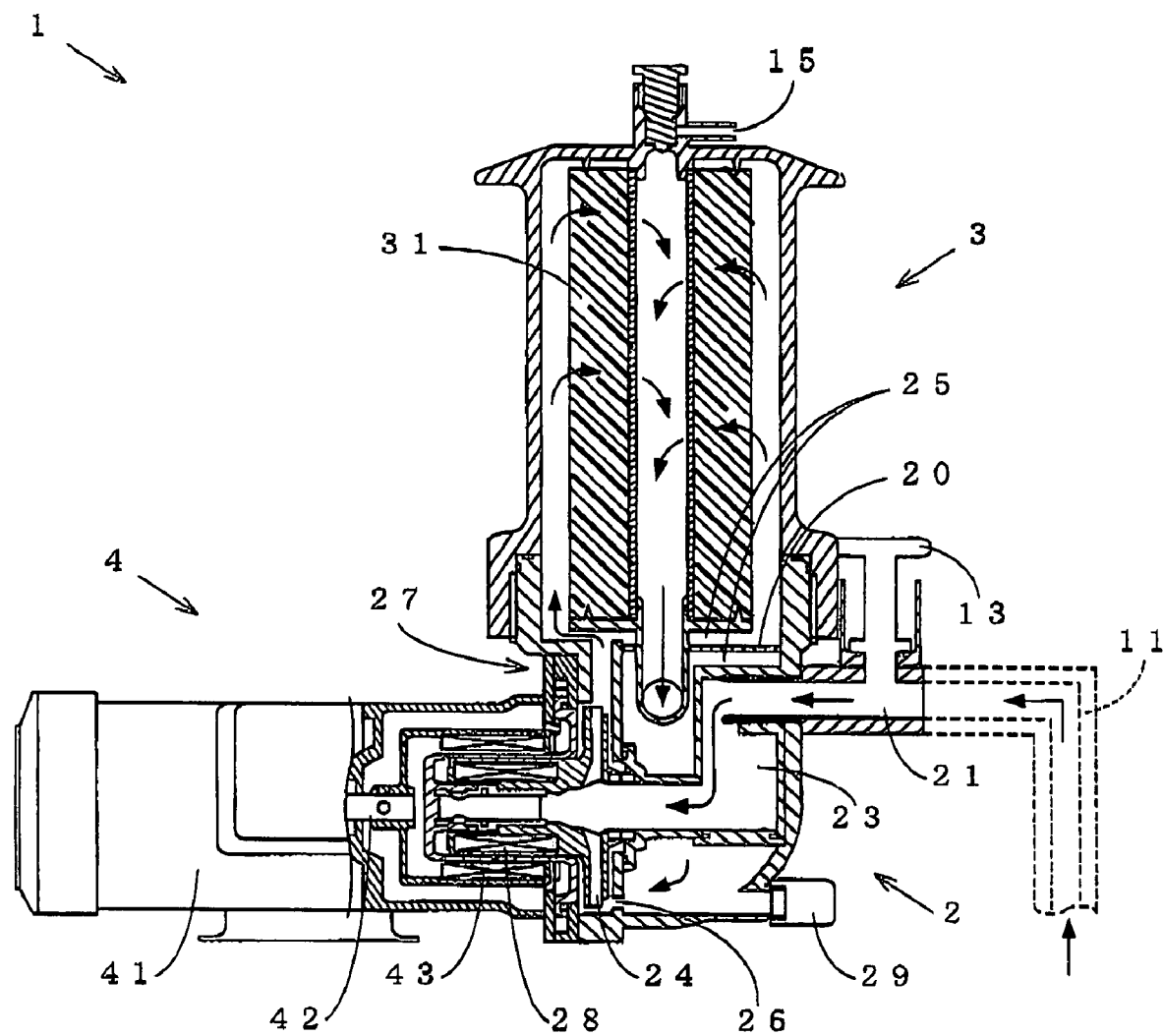
FIG. 2 is a schematic cross-sectional view taken along the line II to II in FIG. 1, showing a suction channel.
Figure 3:
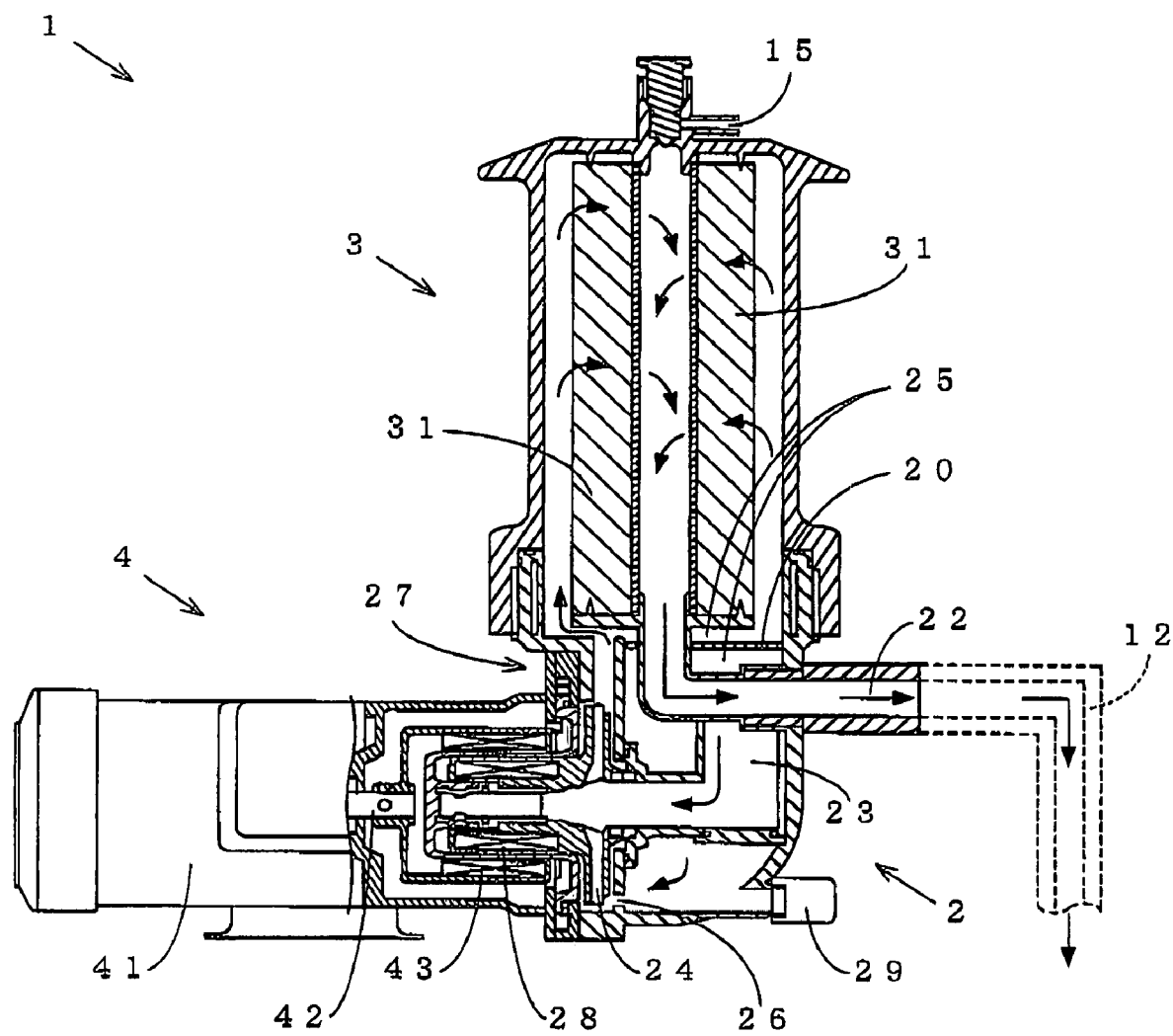
FIG. 3 is a schematic cross-sectional view taken along the line III to III in FIG. 1, showing a discharge channel.

FIGS. 1 to 3 show a filtration device combined with self-priming pump 1 as the first embodiment of the present invention. In the filtration device 1 of the first embodiment, a pump unit 2 and a filtration unit 3 are main construction, and two units are assembled as one unit.

According to the pumping operation of the pump unit 3, liquid accumulated in a tank or the like (not shown), is suctioned via a introduction pipe 11 from a suction port 21, and the suctioned liquid is transferred to the filtration unit 3 for filtration, and thereafter, the resultant liquid is delivered via a exhaust pipe 12 from a discharge port 22 to a subsequent process, or delivered back to the original tank or the like for circulation.

The pump unit 2 is formed as a valveless-construction self-priming pump without a check valve. The pump unit 2 is configured such that the suction port 21, a suction chamber 23, an impeller 24, a self-priming chamber 25, and a discharge port 22 are arranged in this order from an upstream of the channel to a downstream thereof, the suction port 21 and the discharge port 22 are arranged above the level of the suction chamber 23 and the impeller 24, and the self-priming chamber 25 is arranged above the level of the suction port 21 and the discharge port 22. The pump unit 2 is driven by a drive unit 4.

In FIGS. 1 to 3, the reference numeral 13 refers to a priming cock for priming upon (note: this is used when the device is set up, not re-operation); 14 a barometer; 15 an air removal unit for exhausting air flowed in the inside of the pump unit 2 at the time of starting the operation, during the operation, and at the time of resuming the operation; 16 a safety check valve arranged below the level of the filtration unit 3 and for checking residual liquid left in the filtration unit 3 at the time of replacement of a filter 31; 20 a perforated plate a perforated plate having many small holes for air passages, arranged inside of the self-priming chamber 25, for separating the liquid and the air; 26 a self-priming circulation hole; 27 a casing discharge port; 28 an inner magnet, which is a permanent magnet; 29 a cap of the drain; 41 a motor; 42 a drive shaft; and 43 an outer magnet, which is a permanent magnet, rotated via the drive shaft 42 by the motor 41.

For the pump unit 2, a well known and used valveless-construction self-priming pump without a check valve that needs no priming and removal of air at the time of resuming the operation may be adopted. An example of such a type includes a "self-priming chemical pump" described in Japanese Patent No. 2665140, which is a technology proposed by the present applicant. To expedite a self-priming operation at the time of resuming the operation, the suction chamber 23 and the self-priming chamber 25 are preferably equal or approximately equal in capacity.

The drive unit 4 preferably is a magnet-coupling type drive unit configured such that the motor 41 rotates the outer magnet 43 via the drive shaft 42, and the outer magnet 43 rotates the inner magnet 28 by magnetic force in a liquid-tight non-contact state to rotate the impeller 24 connected to the inner magnet thereby to perform a pump operation.

The filtration unit 3 is arranged on the channel between the self-priming chamber 25 and the discharge port 22, and above the level of the self-priming chamber 25 (in this embodiment, connected above the self-priming chamber 25 as one unit). Inside of the filtration unit 3, the filter 31 is arranged above the level of the residual liquid left in the pump unit 2 at the time of suspending the operation of the pump unit 2.

The filter 31 may be arranged and configured such that it is arranged on the channel between the self-priming chamber 25 and the discharge port 21 and the liquid can be filtered above the level of the self-priming chamber 25. One or a plural number of plate-shaped filters may be arranged in the channel. However, a cylindrical filter preferably is arranged and configured in a standing condition inside of the filtration unit 3, as shown in the embodiment.

The cylindrical shape of the filter 31 permits filtration of the liquid delivered through the self-priming chamber 25 of the pump unit 2 to the filtration unit 3 when the liquid permeates from the outside of the filter 31 to the inside of the cylindrical shape, whereby impurities are removed. The liquid filtered as a result of being permeated and delivered to the inside of the filter 31 is delivered from the discharge port 22 to a subsequent process, or delivered back to the tank for circulation. The permeating direction of the liquid with respect to the filter 31 is not limited to a configuration such that the liquid permeates from the outer to the inner direction as in this embodiment. In a channel configured such that the liquid reaches from the self-priming chamber 25 via the filtration unit 3 to the discharge port 22, the liquid may permeate from the inner to the outer direction.

For a filtering material of the filter 31, a publicly known and used filtering material used for a filtering device of this type can be used. It is possible to use the filtering material selected appropriately according to liquid to be filtered, and types, sizes, or the like, of impurities to be removed.

When the filter 31 is a cartridge type that is detachable and replaceable, the replacement work can be completed by a very simple task of replacing the cartridge-type filter, and hence, preferable.

Subsequently, the replacement work of the filter 31 is described.

When it is time to replace the filter 31, or when the filter 31 needs to be replaced due to a change to a filter 31 having a different mesh, the operation of the pump unit 2 is first suspended.

The suspension of the operation of the pump unit 2 allows the liquid inside of the filtration device combined with self-priming pump 1 to flow back from the discharge port 22, the filter 31, the self-priming chamber 25, the casing discharge port 27, the suction chamber 23, and to the suction port 23, and discharged therefrom.

As a result of the flowing back and the discharge of the liquid, out of the liquid inside of the filtration device combined with self-priming pump 1, the liquid above the level of the suction port 21 and the discharge port 22, that is, the liquid inside of the filtration unit 3 and the self-priming chamber 25 is emptied. The liquid accumulated or adhering in the mesh or on the surface of the filter 31 is also flown out. Thus, the filter 31 inside of the filtration unit 3 can be extracted and replaced without causing the liquid dripping. Therefore, the filter replacement work can be performed very easily and safely, without contaminating a worker or surrounding areas of the device.

It is noted that upon replacement of the filter 31, it is preferable to check that the liquid is not left inside of the filtration unit 3 and the self-priming chamber 25 by releasing the safety valve 16. When the residual liquid is left inside of the filtration unit 3, the liquid is discharged from the released safety valve 16.

Due to a siphon cut upon flowing back, out of the liquid inside of the filtration device combined with self-priming pump 1, the liquid below the level of the suction port 21 and the discharge port 22, that is, the liquid inside of other channels such as the suction chamber 23 and the impeller 24, is left. Thus, the operation can be immediately resumed simply by restarting the pump unit 2, without removal of air or priming. In particular, when the perforated plate 20 for separating the air and the liquid is provided inside of the self-priming chamber 25, the air is separated from the liquid containing the air at the time of self-priming. Thus, the air separated from the liquid moves upward to be expelled from the air removal unit 15, and the liquid in which the air is separated can move downward. As a result, it becomes possible to suppress a performance deterioration of the impeller 24 caused due to a decrease in centrifugal force when the liquid containing the air enters, and hence, preferable.

Subsequently, a second embodiment of the present invention is described according to the FIG. 4.

Figure 4:
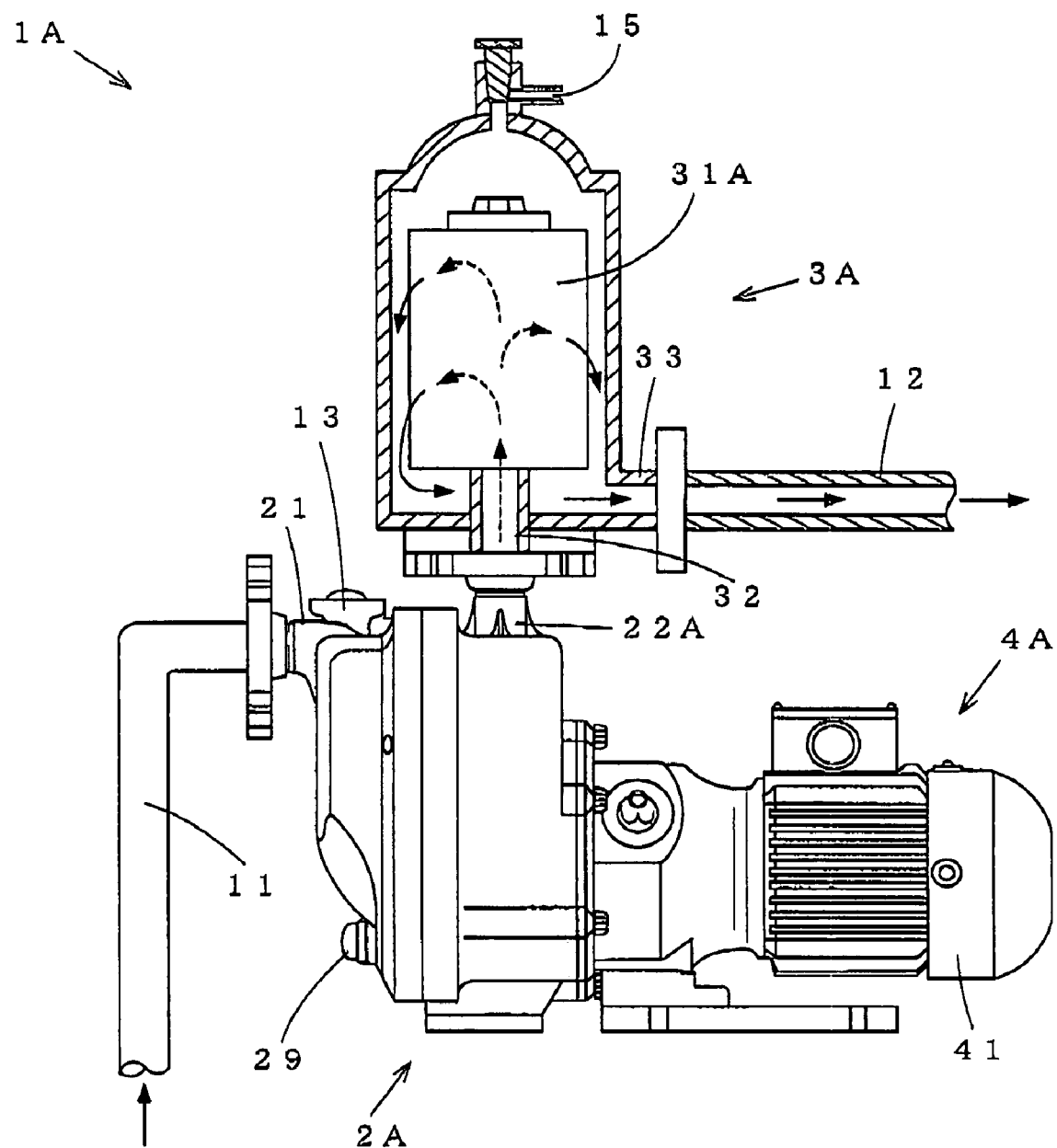
FIG. 4 is a schematic partial cross-sectional view showing a second embodiment.

FIG. 4 shows the second embodiment of the filtration device 1A of the present invention, a pump unit 2A and a filtration unit 3A is formed in a separate unit, two units are connected each other, namely, the filtration unit 3A is connected above the pump unit 2A through the discharge port 22A of the pump unit 2A. And, the filtration unit 3A is formed similarly as the filtration unit 3 in the first embodiment.

For the pump unit 2A, similar to the first embodiment, a publicly known and used valveless-construction self-priming pump without a check valve that needs no priming and removal of air at the time of resuming its operation, may be adopted. A "self-priming chemical pump" described in Japanese Patent No. 2665140, which is a technology proposed by the present applicant, and other self-priming pumps already existing and installed can be used therefor.

The pump unit 2A preferably is configured to include a drive unit configured similarly to the drive unit 4 in the first embodiment or a drive unit publicly known and used as a drive unit for a self-priming pump of this type.

As described above, the filtration unit 3A has a filter 31A arranged inside thereof, similarly to the filtration unit 3 in the first embodiment. The filter 31A is to be arranged and positioned above the level of the residual liquid inside of the pump unit 2A at the time of suspending the operation of the pump unit 2A because the filtration unit 3A is connected above the pump unit 2A.

In the second embodiment, the permeating direction of the liquid with respect to the filter 31A is configured such that the liquid permeates from the inside of the filter 31A to the outside thereof, unlike the configuration of the first embodiment such that the liquid permeates from the outside to the inside.

The connection between the pump unit 2A and the filtration unit 3A is established by connecting an entry 32 of the filtration unit 3A to a discharge port 22A of the pump unit 2A. An exit 33 of the filtration unit 3A corresponds to the discharge port 22 in the first embodiment. Therefore, the exhaust pipe 12 connected to the discharge port 22 in the first embodiment is to be connected to the exit 33 in the second embodiment.

It is noted that in the second embodiment shown in FIG. 4, the components having the same reference numerals, such as the rest of the configuration of the pump unit 2A, and other configurations of the filter 31A such as a shape thereof and a type of a filtering material, are the same as those in the first embodiment shown in FIGS. 1 to 3. Thus, its description is omitted.

According to the filtration device combined with self-priming pump 1A shown as the second embodiment, the filter 31A inside of the filtration unit 3A can be extracted and replaced without causing liquid dripping, similar to the filtration device combined with self-priming pump 1 shown in the first embodiment. Thus, the filter replacement work can be performed very easily and safely, without contaminating a worker or surrounding areas of the device. Thus, it is possible to resume the operation simply by restarting the pump unit 2A, without removal of air or priming.

The invention claimed is:

1. A filtration device combined with self-priming pump, comprising
   a pump unit, which is a valveless construction self-priming pump without a check valve, including:
   a suction port, a suction chamber, an impeller, a self-priming chamber, a discharge port from an upstream of a channel to a downstream thereof in this order;
   the suction port and the discharge port being arranged above a level of the suction chamber and the impeller;
   the self-priming chamber being arranged above a level of the suction port and the discharge port; and
   a filtration unit arranged on a channel between the self-priming chamber and the discharge port and above a level of the self-priming chamber; and a filter arranged inside of the filtration unit and above a level of residual liquid inside of the pump unit at a time of suspending of the pump unit.

2. The filtration device combined with self-priming pump according to claim 1, wherein the filtration unit is arranged above the self-priming chamber.

3. The filtration device combined with self-priming pump according to claim 1, wherein the suction chamber and the self-priming chamber are equal or approximately equal in capacity.

4. The filtration device combined with self-priming pump according to claim 1, wherein the pump unit and the filtration unit are configured as one unit.

5. The filtration device combined with self-priming pump according to claim 1, wherein the pump unit and the filtration unit are configured as a separate unit such that the filtration unit is connected above the pump unit.

6. The filtration device combined with self-priming pump according to claim 1, wherein the filter is a cartridge type that is detachable and replaceable.

7. The filtration device combined with self-priming pump according to claim 1, wherein a drive unit of the pump unit is a magnet-coupling type drive unit.

8. The filtration device combined with self-priming pump according to claim 1, wherein inside of the self-priming chamber, a perforated plate for separating air and liquid is arranged.

9. The filtration device combined with self-priming pump according to claim 1, wherein below a level of the filtration unit, a safety check valve for checking and/or discharging residual liquid inside of the filtration unit is arranged.

* * * * *